(12) United States Patent
Stevenson et al.

(10) Patent No.: US 11,465,106 B2
(45) Date of Patent: Oct. 11, 2022

(54) EXPANSION CHAMBER FOR A WINE BOTTLE AERATOR

(71) Applicants: Robert A. Stevenson, Canyon Country, CA (US); Wendy L. Stevenson, Canyon Country, CA (US); Jennifer L. Stevenson, Newbury Park, CA (US); Ryan A. Stevenson, Woodinville, WA (US)

(72) Inventors: Robert A. Stevenson, Canyon Country, CA (US); Wendy L. Stevenson, Canyon Country, CA (US); Jennifer L. Stevenson, Newbury Park, CA (US); Ryan A. Stevenson, Woodinville, WA (US)

( * ) Notice: Subject to any disclaimer, the term of this patent is extended or adjusted under 35 U.S.C. 154(b) by 0 days.

(21) Appl. No.: 17/445,942

(22) Filed: Aug. 25, 2021

(65) Prior Publication Data
US 2021/0387148 A1 Dec. 16, 2021

Related U.S. Application Data

(63) Continuation-in-part of application No. 15/929,670, filed on May 14, 2020.

(51) Int. Cl.
*B01F 23/23* (2022.01)
*B01F 23/2361* (2022.01)
(Continued)

(52) U.S. Cl.
CPC ...... *B01F 23/2361* (2022.01); *B01F 33/5011* (2022.01); *B01F 23/237611* (2022.01); *B01F 2101/17* (2022.01)

(58) Field of Classification Search
CPC .......... B01F 2215/0072; B01F 3/04794; B01F 13/002; B01F 2003/04872; B01F 23/2361;
(Continued)

(56) References Cited

U.S. PATENT DOCUMENTS 2,408,306 A 9/1946 Flournoy
2,680,010 A 6/1954 Dubay
(Continued)

FOREIGN PATENT DOCUMENTS

DE 10 2013 000042 B3 11/2013
GB 399 352 A 10/1933
GB 498 536 A 1/1939

OTHER PUBLICATIONS

"Gasket", Wikipedia, published Oct. 8, 2012, retrieved Sep. 26, 2017 from https://en.wikipedia.org/w/index.php?title=gasket&oldid=516616155.
(Continued)

*Primary Examiner* — Stephen Hobson
(74) *Attorney, Agent, or Firm* — Hackler Daghighian Martino & Novak

(57) ABSTRACT

A hollow expansion chamber of the present invention is configured to temporarily contain an expansion of bubbles during an aeration process for aerating a liquid, where a chamber body of the expansion chamber has an oblate spheroid shape. When moving circumferentially downward along the chamber body starting from a maximum inside diameter, the oblate spheroidal shape of a bottom portion has a first integral transition that is a tangential transition to a first frustoconical shape. Continuing moving circumferentially downward, the first frustoconical shape has a second integral transition to a cylindrical extension. The cylindrical extension at a distal end has a bottom opening configured to fit within an opened bottleneck. The first frustoconical shape has a minimum angle of 15 degrees relative to a horizontal plane. The second integral transition is a radial second integral transition having an inside surface radius of at least 0.25 inches.

20 Claims, 11 Drawing Sheets

(51) Int. Cl.
*B01F 33/501* (2022.01)
*B01F 23/237* (2022.01)
*B01F 101/17* (2022.01)

(58) Field of Classification Search
CPC .......... B01F 33/5011; B01F 23/237611; B01F 2101/17; B01F 23/23611; B01F 23/237612; B01F 23/237621; B01F 35/32025; B01F 23/23123; C12H 1/14
See application file for complete search history.

(56) References Cited

U.S. PATENT DOCUMENTS

| | | | |
|---|---|---|---|
| 3,309,067 | A | 3/1967 | Brewster |
| 3,549,051 | A | 12/1970 | Bencic |
| 4,494,452 | A | 1/1985 | Barzo |
| 4,763,803 | A | 8/1988 | Schneider |
| 4,785,724 | A | 11/1988 | Vassallo |
| 5,095,710 | A | 3/1992 | Black |
| 5,154,112 | A | 10/1992 | Weltern |
| 5,595,104 | A | 1/1997 | Delaplaine |
| 6,508,163 | B1 | 1/2003 | Weatherill |
| 6,568,660 | B1 | 5/2003 | Flanbaum |
| D535,559 | S | 1/2007 | Kehoe |
| 8,561,970 | B1 | 10/2013 | Mills |
| 8,567,305 | B2 | 10/2013 | Bregman |
| D701,080 | S | 3/2014 | Mills et al. |
| D701,081 | S | 3/2014 | Mills et al. |
| D705,004 | S | 5/2014 | Mills |
| D716,612 | S | 11/2014 | Mills et al. |
| 9,168,495 | B2 | 10/2015 | Connors |
| 9,283,526 | B2 | 3/2016 | Smith |
| 9,321,018 | B2 | 4/2016 | Connors |
| 9,321,019 | B2 | 4/2016 | Stevenson et al. |
| 9,795,934 | B2 | 10/2017 | Connors |
| D810,507 | S | 2/2018 | Gaeta |
| 2010/0258509 | A1 | 10/2010 | Iwaki |
| 2011/0274805 | A1 | 11/2011 | Nudi, Jr. et al. |
| 2011/0297006 | A1 | 12/2011 | Belcher |
| 2013/0255505 | A1 | 10/2013 | Verbicky |
| 2013/0292857 | A1 | 11/2013 | Connors |
| 2014/0065266 | A1 | 3/2014 | Shalev |
| 2014/0120226 | A1 | 5/2014 | Kuru |
| 2014/0242241 | A1 | 8/2014 | Chen |
| 2016/0175782 | A1 | 6/2016 | Lau |
| 2016/0339398 | A1* | 11/2016 | Stevenson ........... B01F 3/04794 |
| 2018/0257045 | A1 | 9/2018 | Simone |

OTHER PUBLICATIONS

"Counterbore", Wikipedia, published Oct. 4, 2012, retrieved Sep. 26, 2017 from https://en.wikipedia.org/w/index.php?title=counterbore&oldid=516021455.

RS Components, "Peltier effect heat pumps," Data Pack F, Mar. 1999, Corby, Northamptonshire, England.

Sensidyne, KP, Gillian 5000—Programmable 5 Liter Live Flow Air Sampling Pump Product Specifications Jul. 2009, St. Petersburg, Florida.

Customer reviews: Rabbit Wine Aerator Shower Funnel with Sediment Strainer, Mar. 13, 2019 from https://www.amazon.com/Rabbit-Aerator-Shower-Sediment-Strainer/product-reviews/B000YDGMNW.

"Math of soap bubbles and honeycombs," Brilliant.org., Retrieved 15:45 Mar. 13, 2019 from https://brilliant.org/wiki/math-of-soap-bubbles-and-honeycombs/.

* cited by examiner

EXPANSION CHAMBER FOR A WINE BOTTLE AERATOR

CROSS-REFERENCE TO RELATED APPLICATIONS

This continuation-in-part application claims priority to application Ser. No. 15/929,670 filed May 14, 2020, the entire contents of which are hereby incorporated in full by this reference.

DESCRIPTION

Field of the Invention

The present invention generally relates to a device that aerates wine in a wine glass, bottle or other container at an accelerated rate through the expansion and control of aeration bubbles that are captured with an expansion chamber. More particularly, this invention concerns critical improvements in the expansion chamber such that the field of aeration bubbles dissipates more quickly.

Background of the Invention

Decanting of red wine has been a long tradition in the wine industry. In decanting, the wine is simply poured into another container, usually one of clear glass or crystal. Decanting is particularly important for most young red wines (between three to ten years old). These younger wines can be harsh or astringent if consumed directly after opening the bottle. Such wines have this harsh character because red wine has been maintained in a relatively oxygen-free environment during aging in a bottle. Over time, this environment results in a closed character for the beverages that is derived from the accumulation of particular aroma compounds. A wine's aroma will change during the first ten to thirty minutes after the bottle is opened. Decanting accelerates the breathing process, which increases the wine's aromas from natural fruit and oak by allowing a few volatile substances to evaporate. Decanting also softens the taste of tannins that cause harshness and astringency in young wines. In older red wines, the tannin reactions have proceeded long enough to reduce astringency. As a result, the taste is not as harsh when the wine is drunk straight out of the bottle. In comparison to reds, white wines have little tannin and are not aged in bottles for very long before serving. Thus, they have very little opportunity to develop bottle aromas that need evaporation. Instead, their natural fruit aromas more specifically define their taste. There are however, a number of white wines that can benefit from decanting, or specifically aeration.

In the past, it was quite common for wines poured from both barrel and bottle to contain a considerable amount of solid matter (i.e. sediments). However, most wines on the shelves today have gone through a filtering process and are substantially clear. Certain high-end wines, particularly after long term storage, can still have substantial sediments. Decanting a young wine (particularly one with no sediment) involves pouring the wine into another decanter and letting it sit for twenty minutes or so before you serve it and you will likely notice a dramatic increase in subtlety and complexity. If you have the luxury of time, one can continue tasting the wine over a period of hours. Many wines keep evolving and improving over time. Some experts believe that decanting all types of wines from Bordeaux to Burgundy and even whites can beneficially affect the wine.

Of course the problem with decanting is that it takes a substantially long period of time for the oxygen to work its miraculous effects on the taste of the wine. If one knows, for example, a day in advance that they are going to be having a meal with a particular type of wine, the wine may be uncorked and decanted as much as a day before. Some experts have recommended the following process for properly drinking a bottle of red wine: First, chill the red wine in a refrigerator for at least two hours. Second, uncork the bottle of wine and decant it. Allow it to come back to room temperature over a period of hours. Third, taste and then drink the wine. The process of warming back up tends to pull more oxygen in from the surrounding air thereby refining the wine. The inventors have actually done this process and it works amazingly well. The downside is that is very time consuming.

However, all of this historical decanting and ritual that one goes through with wine (particularly red wine) ignores the simple physics. It is really only the act of pouring the wine from one bottle to a different container that has any real meaningful effect as this is when surface tension is broken up and oxygen from the surrounding air actually has a chance to interact with wine molecules. Once the wine is decanted and sitting again in a calm state, there is a surface tension across the surface of the fluid thereby making gas exchange a very slow and long process.

Accordingly, there is a need to rapidly aerate wine and perfect an oxygen exchange to remove the astringent taste and reduce the tannin levels. U.S. Pat. No. 4,785,724 to Vassallo describes an apparatus for aerating bottled wine. Referring to FIG. 1 of Vassallo, one can see a wine bottle 1 which is full of wine and an aeration tube 20, 21 disposed into the bottle of wine terminating at a distal end 22 in a structure with fine holes to break up the air flow into final bubbles. The problem with the Vassallo invention is that the air flow rate through the tube 20, 21 has to be extremely low so that the wine does not form bubbles and froth out the top and create a mess all over the base unit 2. The inventors have experimented with such techniques and have found that this is no more efficient than decanting. In other words, it can take up to 20 minutes by very slowly putting bubbles into the wine and creating a slight surface agitation such that the wine will not froth out of the bottle.

Reference is also made to U.S. Pat. No. 5,154,112 to Wettern. In the Wettern invention, there is a manual pump disposed over the top of the wine bottle which one manually compresses. Referring to FIGS. 1 and 2 of the '112 patent, one can see the end of the pump 8 and a seating collar 13 where it sits on the neck of the wine bottle. Referring to FIG. 2, one can see the manual pump in cross-section and one can see the area 13 and note that there is not a liquid tight seal formed. This means that as air is injected down into the wine bottle, as shown in FIG. 1, it would have to be an extremely low flow rate. If a bubble froth was formed, that would mean that liquid and bubbles would escape between the neck of the wine bottle and the collar 13 which only loosely rests on the end of the wine bottle. This is a major deficiency of the invention as previously described in the Vassallo '724 patent. In other words, the Wettern invention would only work at extremely low flow rates.

Another wine bottle aerator is described in U.S. Pat. No. 5,595,104 to Delaplaine. FIG. 1 of Delaplaine shows an air pump housing 12, a sealing apparatus 14, an extension tube 16 and an end with aeration holes 18. There is an air escape hole 24, as shown. The '104 patent suffers from all of the same deficiencies as described in the Vassallo and Wettern patents. The deficiency is the air flow out of the distal tip 18 would have to be extremely low such that a bubble and froth wasn't created, which would cause wine to overflow the outside of the wine bottle and pour, for example, down onto a countertop.

U.S. Pat. No. 8,561,970 to Mills, et al. describes another type of low volume aeration system. The Mills, et al. aeration system does not have an expansion chamber and is therefore, by definition a low volume system. This is in marked contrast to the present invention, which is a high volume aeration system able to achieve complete aeration and reduction of tannins in the wine in less than 10 seconds or some specific time period much shorter than the prior art. All of the aforementioned prior art requires at least several minutes of aeration at a very slow rate. The reason for this is simple physics. If one drives a very high volume of gas, such as air or oxygen into the bottle of a bottle of wine, a great deal of bubble formation and froth will immediately occur. Unless there is an expansion chamber, this froth will spill over the top of the wine bottle and create a mess.

The inventors of the present invention have indeed invented such an expansion chamber. However, the inventors have recently discovered a deficiency in their previous designs and have found a solution to overcome it. Therefore, this application is an improvement over the inventor's previous application Ser. No. 15/929,670 filed on May 14, 2020, the contents of which is fully incorporated herein with this reference. For convenience and understanding of the reader, the reference numerals in this application are consistent with the reference numerals in the '670 application.

SUMMARY OF THE INVENTION

A hollow expansion chamber (12') of the present invention is disclosed having a chamber body (200) defined as having a top portion (14) above a bottom portion (16), wherein both the top portion and the bottom portion cooperatively form a hollow chamber volume (202) configured to temporarily contain an expansion of bubbles (54') during an aeration process for aerating a liquid, the liquid being wine and other alcoholic beverages. The chamber body has an oblate spheroidal shape (230). The top portion and bottom portion meet to define a maximum inside diameter (124). The maximum inside diameter is formed along a major axis (234) when the oblate spheroidal shape is rotated about a minor axis (232). When moving circumferentially downward along the chamber body starting from the maximum inside diameter, the oblate spheroidal shape of the bottom portion has a first integral transition (236) to a first frustoconical shape (238). Continuing moving circumferentially downward, the first frustoconical shape has a second integral transition (240) to a cylindrical extension (242). The cylindrical extension at a distal end (244) has a bottom opening (206), wherein the bottom opening is configured to engage inside an opening of an uncorked and/or opened wine bottle. The top portion has a top opening (204), the top portion being disposed above the opening of the uncorked and/or opened bottle when the bottom opening is engaged with the opening of the uncorked and/or opened bottle. The hollow chamber volume is in fluid communication with surrounding air through the top opening. The hollow chamber volume is configured to be in fluid communication with an inside of the uncorked and/or opened bottle when the bottom opening is engaged with the opening of the uncorked and/or opened bottle. The maximum inside diameter of the hollow chamber volume in a horizontal plane (208) with respect to the uncorked and/or opened wine bottle set upon a horizontal surface is cooperatively formed between the top and bottom portions. When the hollow expansion chamber is oriented with the top opening directly above the bottom opening, an entirety of an inside surface (246) of the hollow chamber volume of the chamber body is internally sloped to drain all the liquid out through the bottom opening. The first integral transition is a tangential first integral transition between the bottom portion of the chamber body to the first frustoconical shape. The first frustoconical shape has a minimum angle (248) of 15 degrees relative to the horizontal plane. The second integral transition is a radial second integral transition having an inside surface radius (250) of at least 0.25 inches.

In other exemplary embodiments, the first frustoconical shape may have the minimum angle (248) of 20 or 25 degrees relative to the horizontal plane.

In other exemplary embodiments, the radial second integral transition may have the inside surface radius (250) of at least 0.325 or 0.50 inches.

In other exemplary embodiments, the expansion chamber may be optically transparent or translucent, and wherein the chamber body may consist of a polymer or of a glass.

In other exemplary embodiments, it may include a sealing element (44) attached to the bottom opening of the expansion chamber, wherein the sealing element is configured to seal against an inside surface of the opening of the uncorked and/or opened bottle, wherein the sealing element comprises an elastic or rubber-like material.

In other exemplary embodiments, the maximum inside diameter may be at least 2.50 inches, or may be at least 2.75 inches and less than 4.5 inches, or may be at least 3.0 inches and less than 4.25 inches, or may be at least 3.25 inches and less than 4 inches, or may be at least 3.50 inches and less than 3.75 inches, or may have a maximum inside diameter is 3.625 inches plus or minus 10%.

In other exemplary embodiments, the top opening may have a pour spout (120).

In other exemplary embodiments, the top opening of the expansion chamber may be asymmetrically shaped about the minor axis shaped due to the pour spout, and wherein the bottom opening may be symmetrically shaped abut the minor axis.

In other exemplary embodiments, wherein the bottom opening of the expansion chamber may be configured to fit inside of the opening of the uncorked and/or opened wine bottle.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
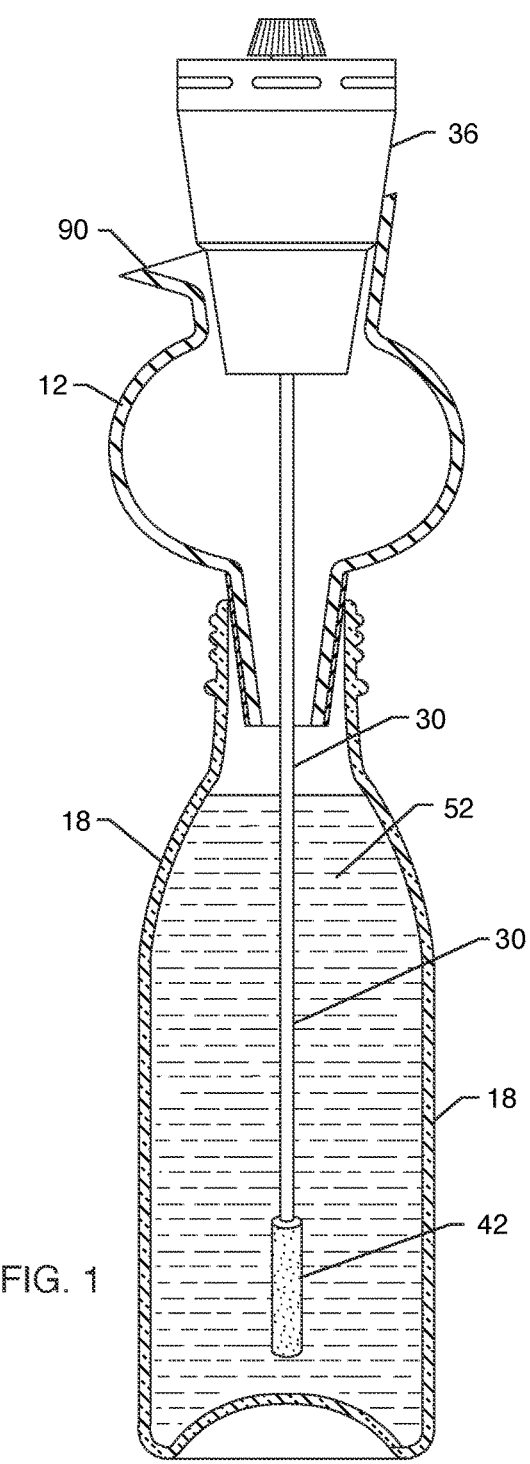
FIG. 1 is a sectional view taken from FIG. 40 of application Ser. No. 15/929,670.

FIG. 1 is taken from FIG. 40 of application Ser. No. 15/929,670 and illustrates a bottle of wine 18 containing wine 52. FIG. 1 illustrates the mating of retention chamber 12 and pour spout 90 to then the pump assembly 36, gas conduit 30 and aeration element 42. Accordingly, the entire contents of U.S. patent application Ser. No. 15/929,670 filed May 14, 2020 are hereby incorporated in full by this reference.

Figure 2:
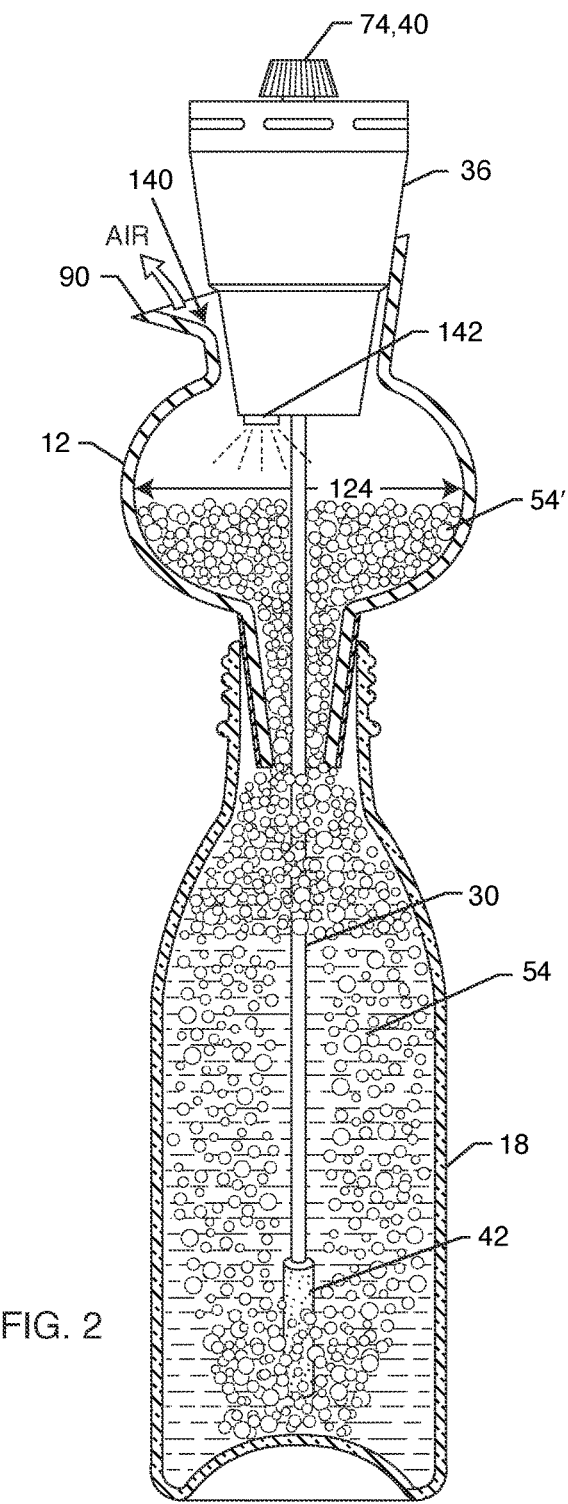
FIG. 2 is a sectional view taken from FIG. 40A of application Ser. No. 15/929,670 and now showing bubble formation in the wine and bubbling into an expansion (retention) chamber.

FIG. 2 is likewise taken from FIG. 40A of the '670 application and illustrates the assembly of FIG. 1 with the pump 36 turned on wherein, the aeration element 42 is generating a column of air bubbles 54, which enter into the retention chamber 12 as bubble field 54'. It is understood by those skilled in the art from reading and understanding the '670 application that in FIG. 2 the aerator pump 36 introduces air bubbles into the bottom of the wine bottle. This in turn creates a bubble field that expands upwards. Therefore, if one was to bubble a wine bottle as shown in FIG. 2, the present invention of the expansion chamber 12 captures the bubble field 54' therein. This not only prevents a mess but also creates a pleasing visual affect while showing the aeration process in action.

The bubble field 54' and the retention chamber 12 will reach stability at the widest diameter point of the retention chamber 12. Through numerous experiments by the inventors, by controlling the maximum diameter of the expansion chamber along with the pump flow rate, one can achieve a steady state condition wherein, the bubbles are (as shown) about halfway up the maximum diameter of the retention chamber 12. Importantly, the pump housing 36 fits snugly into the top opening of the retention chamber 12 and pour spout 90 and the air pump housing shape is designed such that a convenient air passage 140 allows the air that is being generated out of aeration element 42 to escape up through the top.

It would be very undesirable to have too small of a diameter retention chamber 12 or too high of a pump flow rate such that the bubble field 54' did not reach a steady state condition and instead bubbled out undesirably through the air passage 140. Accordingly, there is a design balance that's been accomplished by the inventors such that the bubble field 54' reaches a static (i.e. steady-state) condition as shown. Through various experiments and 3D model prints, the inventors have determined that the minimum possible diameter 124 of the retention chamber 12 is 0.75 inches. At the minimum diameter of 0.75 inches, the retention chamber maximum diameter 12 is quite small, meaning that the pump flow rate would have to be undesirably lowered to a very low rate. This requires a relatively long bubbling time to properly aerate the wine or spirits. On the other hand, a practical upper limit to the diameter 124 of the retention chamber 12 is 5 inches. At 5 inches, a very high pump flow rate can be used. However, at 5 inches, the mass of the retention chamber 12 becomes sufficiently large to create a potential toppling or overturning problem as it is attached to the bottle 18. Furthermore, such a large diameter also creates aesthetic concerns. Obviously, one could go to a retention chamber diameter 124 of even 10 inches, but this would be ridiculously large to have sit on top of a wine bottle 18. It will be understood that the diameter of the retention chamber, can vary in 0.25 inch increments all the way starting from 0.75 inches all the way to 5 inches.

The inventors have performed numerous experiments based on what they thought were the physics of bubble formation only to find out that their initial notions were false. For example, the inventors theorized that if the height of the bubbles were sufficiently large, even in a small column, that the weight of the bubbles would cause them to collapse upon themselves. In fact, through actual experiments, the opposite turned out to be true. In one experiment, the inventors had a retention chamber 12 that was approximately the same diameter as the wine bottle neck and was several inches high. Through actual experimentation, the bubble field went all the way up through the several inches (up to a foot) and still bubbled out the top. This led to a number of other tests where the inventors started to increase the diameter of the retention chamber and it is through those tests, that it was determined that the diameter of the retention chamber was extremely important so that the bubble field would reach a static (i.e. steady state) situation and stop climbing. In summary, contrary to the inventor's initial thoughts and concepts, testing proved that the bubbles readily collapsed down upon themselves when they are in a sufficiently large enough diameter retention chamber 12. When the diameter of the retention chamber 12, 124 gets too small, the bubbles just keep climbing. Another advantage of increasing the diameter 124 in expansion chamber 12 is that the need for a bubble reducing element 68, as described in previous application, was no longer be needed and could be eliminated.

Figure 3:
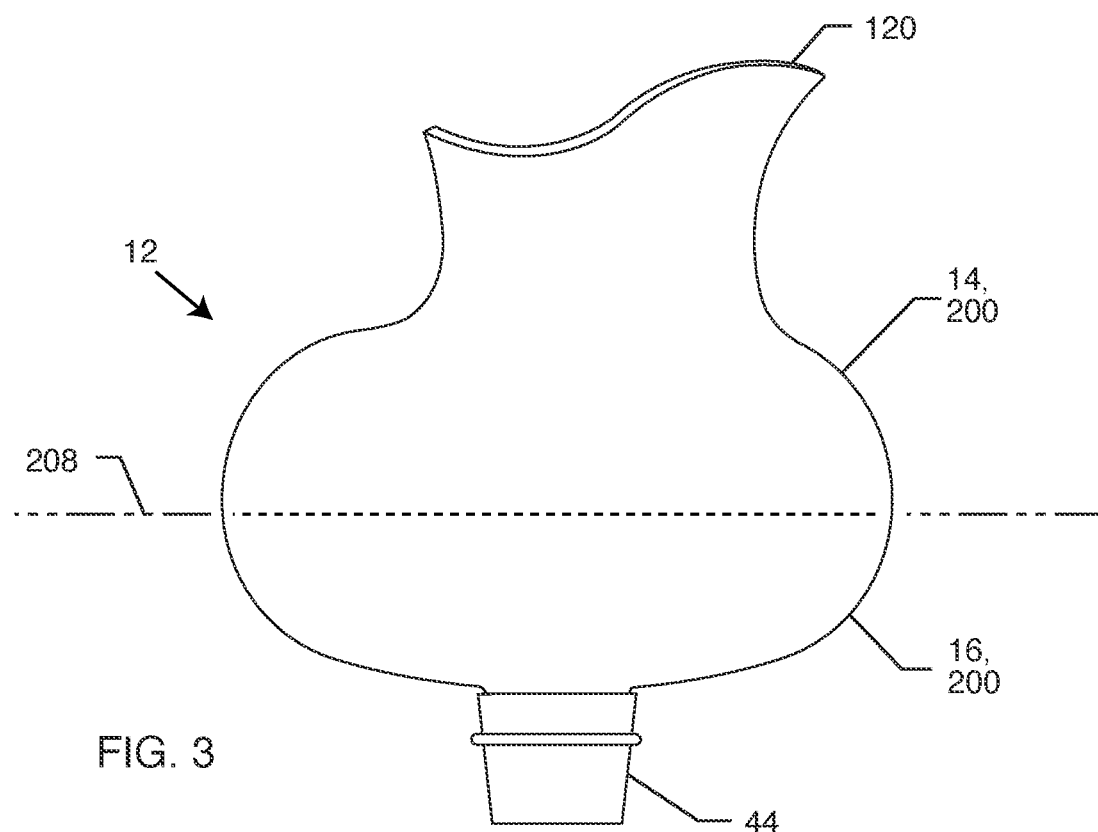
FIG. 3 is a side view of an expansion chamber taken from FIG. 78 of application Ser. No. 15/929,670 now having a sealing element.
Figure 4:
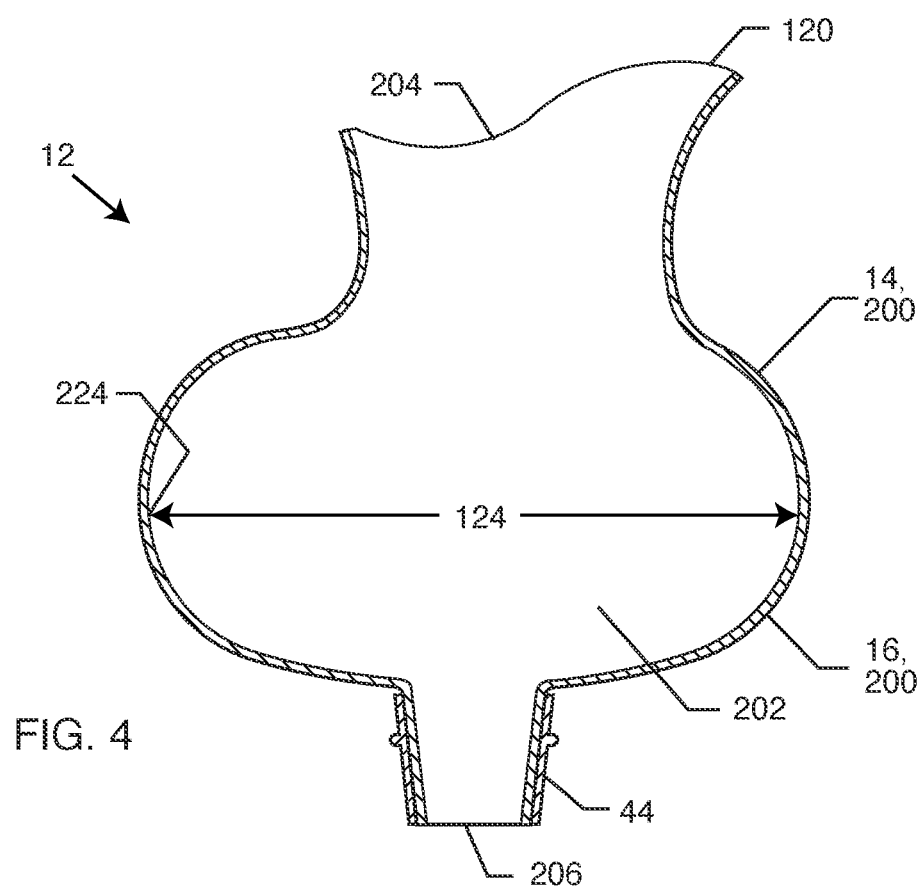
FIG. 4 is a sectional view of the structure of FIG. 3, which was also taken from FIG. 79 of application Ser. No. 15/929,670.
Figure 5:
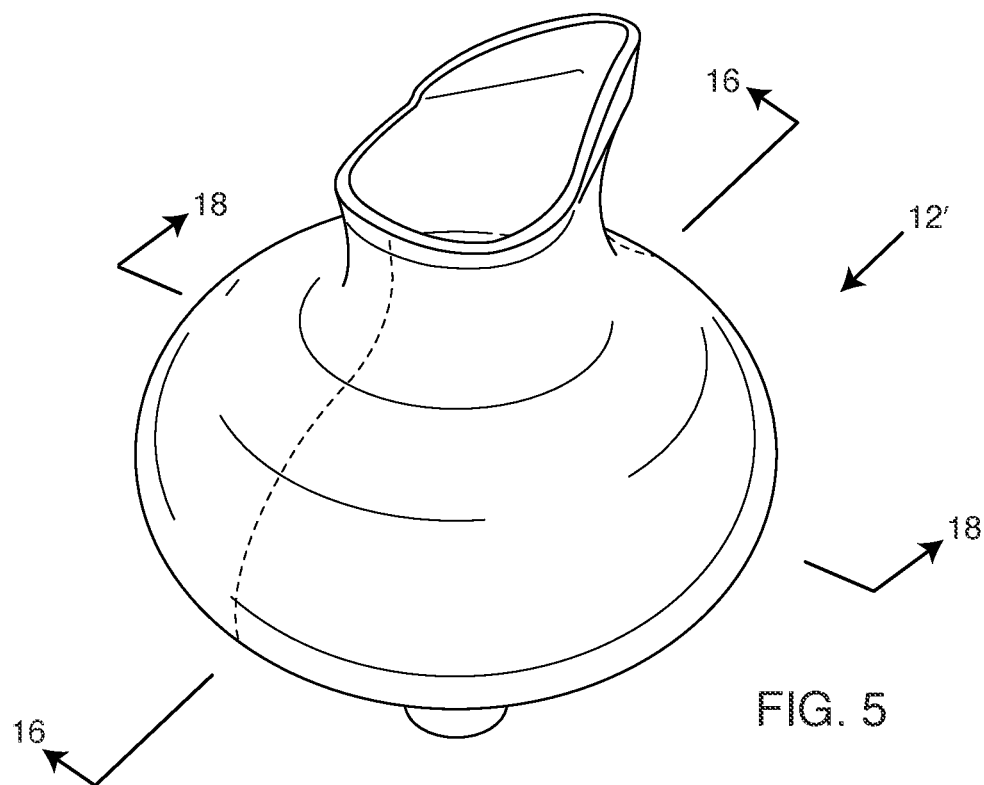
FIG. 5 is a perspective view of a new embodiment of an expansion chamber of the present invention.
Figure 6:
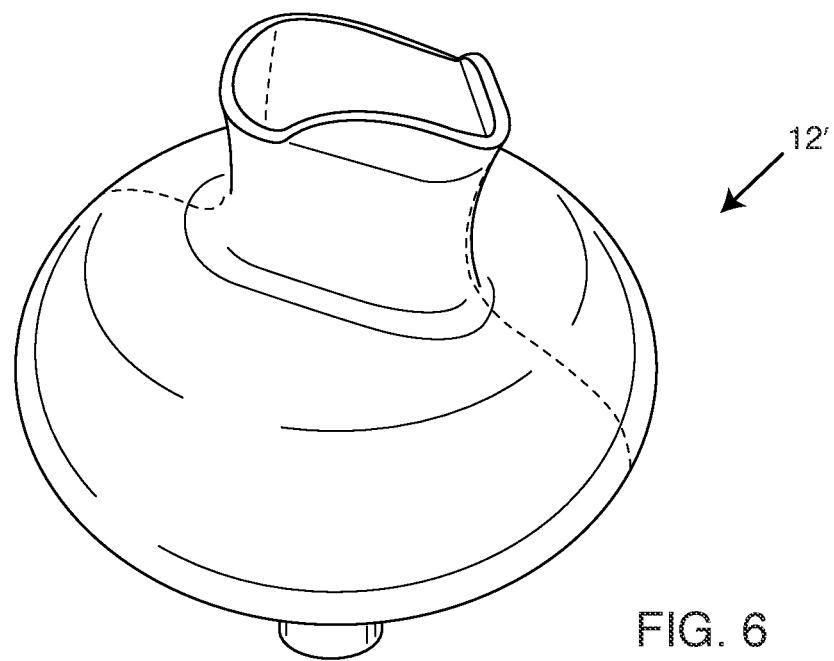
FIG. 6 is another perspective view of the structure of FIG. 5.
Figure 7:
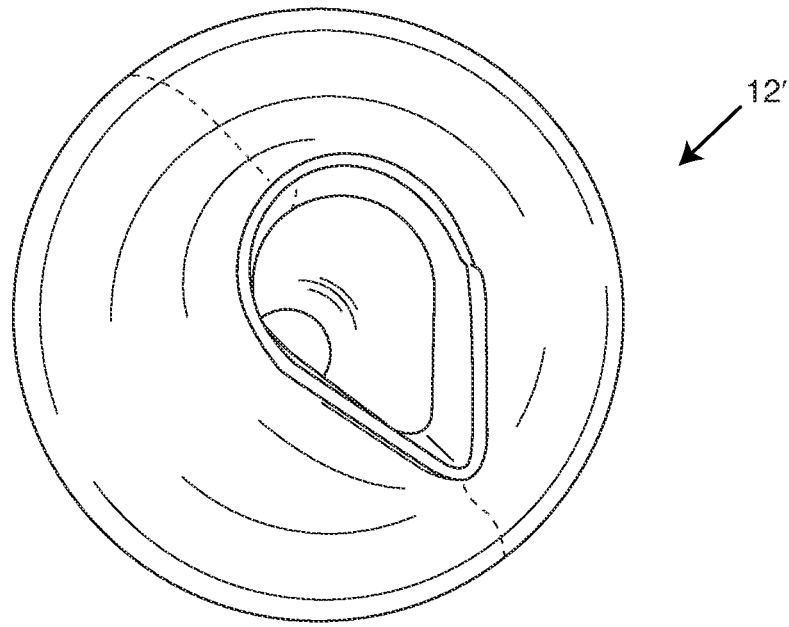
FIG. 7 is another perspective view of the structure of FIG. 5.
Figure 8:
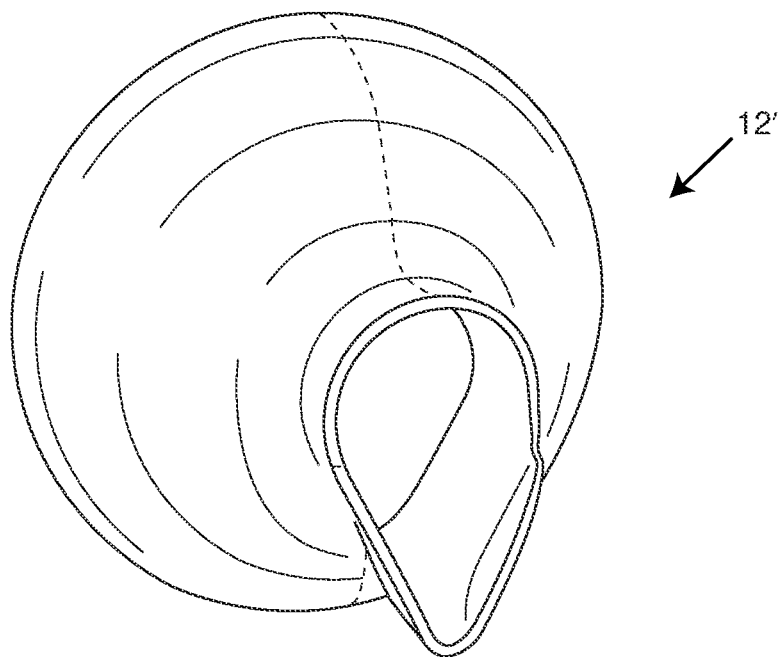
FIG. 8 is another perspective view of the structure of FIG. 5.
Figure 9:
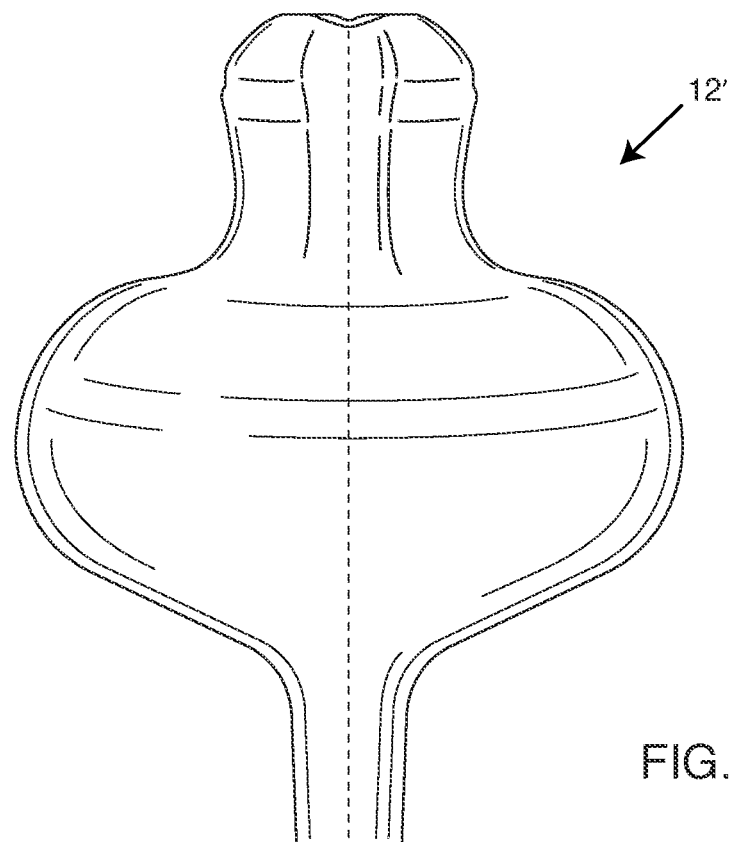
FIG. 9 is a front view of the structure of FIG. 5.
Figure 10:
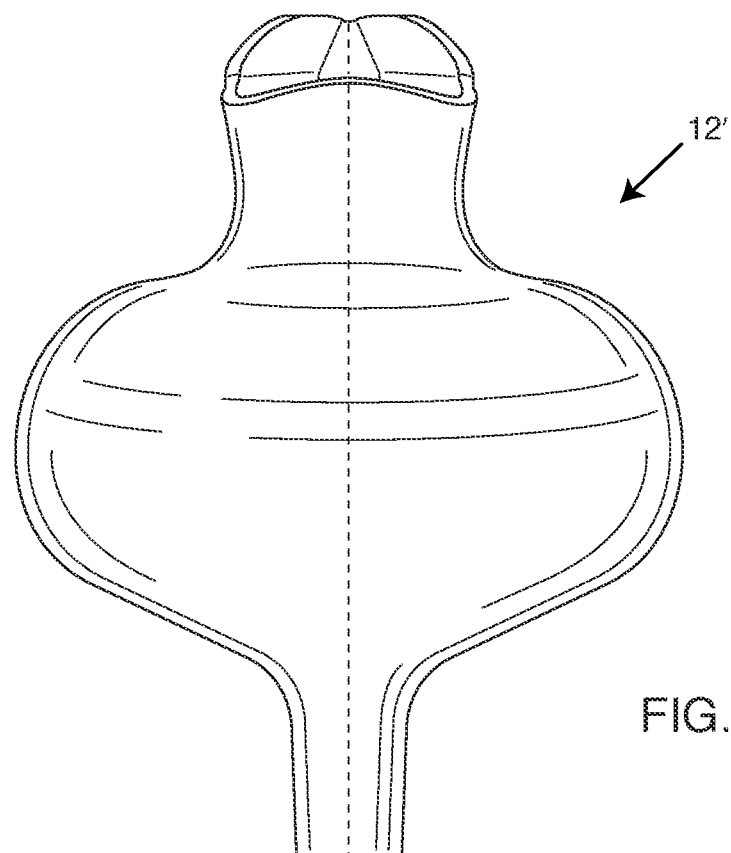
FIG. 10 is a rear view of the structure of FIG. 5.

FIG. 3 is taken from FIG. 78 of the '670 application and is a side view now showing a sealing element 44 disposed at the bottom portion of the expansion chamber 12. FIG. 4 is likewise taken from FIG. 79 of the '670 application and is a sectional view of the structure of FIG. 3. The expansion chamber 12 comprises a chamber body 200 defined as having a top portion 14 above a bottom portion 16. Both the top portion and the bottom portion cooperatively form a hollow chamber volume 202. The hollow chamber volume 202 is configured to temporarily contain an expansion of bubbles during an aeration process for aerating a liquid, including wine and other alcoholic beverages, as previously taught throughout this application and the '670 application.

The bottom portion has a bottom opening 206, wherein the bottom opening is configured to engage an opening of an uncorked and/or opened wine bottle. The top portion has a top opening 204, the top portion being disposed above the opening of the uncorked and/or opened bottle when the bottom opening is engaged with the opening of the uncorked and/or opened bottle. It is understood by this teaching that the hollow chamber volume is configured to be in fluid communication with an inside of the uncorked and/or opened bottle when the bottom opening is engaged with the opening of the uncorked and/or opened bottle. It is also understood herein that the top portion is not sealed and allows air to escape outwardly from the hollow chamber volume 202, whether or not the electrically operated pump structure 36 is disposed within the expansion chamber 12.

The inventors have discovered through repeated trial and error that the maximum inside diameter 124 plays a critical role in allowing the bubble formation to quickly disappear. To the contrary of the inventor's expectation, the height of the expansion chamber played little to no role in quickly reducing bubble formation. Rather, the inventors discovered that if a large enough surface area was created that this would quickly allow the bubbles to reduce. As best seen in FIGS. 3 and 4, this maximum inside diameter 124 of the hollow chamber is defined in a horizontal plane 208 respect to the uncorked and/or opened wine bottle set upon a table. As can be seen in FIG. 4, the maximum inside diameter is cooperatively formed between the top and bottom portions.

In the embodiment shown herein the maximum inside diameter 124 is approximately 3.625 inches. Some variation of the diameter 124 is possible, such as plus or minus 5, 10 or 15%. The diameter of 3.625 inches equates to a surface area of 10.32 inches squared plus or minus 5, 10 or 15%. In the inventor's experience, if the diameter 124 is less than 25% of 3.625 inches, then the bubble formation reduction is greatly impaired such that bubble formation may rise too quickly and spill over the top opening 204.

The inventors have discovered a balance between making the diameter 124 large enough such that bubble reduction quickly occurs while not making the diameter 124 too large such that the expansion chamber becomes unwieldy when in use or from an aesthetic viewpoint. Accordingly, the inventors believe the diameter 124 should be between a set range, such as equal to or between the following values: 2.75-4.5 inches (i.e. area of 5.94-14.12 inches squared); 3.0-4.25 inches (i.e. area of 7.07-13.35 inches squared); 3.25-4 inches (i.e. area of 8.30-12.56 inches squared); and 3.5-3.75 inches (i.e. area of 9.62-11.04 inches squared). In other embodiments, the diameter 124 may be 1.5 inches or greater.

Even at this well-developed stage of the expansion chamber, the inventors of the present invention were surprised that the expansion chamber shown in FIGS. 1-4 was insufficient when used on a full-bodied wine. Said simply, the bubble field 54' did not dissipate in a relatively acceptable period of time. Accordingly, there is still a need for an expansion chamber design that works equally well for all types of wines and liquids. The present invention fulfills these needs and provides other related advantages.

Referring to FIGS. 1-4, the inventors, while aerating a very heavy bodied red wine's bubble field 54' as illustrated in FIG. 2, encountered a problem. This is best illustrated by FIG. 4 where attention is drawn to the transition between curvature 200 and seal portion 44 that is designed to be inserted into the neck of a wine or spirits bottle. The inventors had tested the shape of FIG. 4 for several years and found that this shape efficiently retained the bubble field 54' of FIG. 2 within an efficient and relatively short period time (i.e. the bubble field 54' would collapse back into the wine bottle 18 in a few seconds to as much as about 30 seconds).

The inventors (members of the Stevenson family who are all degreed engineers) were enjoying a special occasion at one of the Stevenson's homes enjoying a bottle of Tamarack Cellars TAMARACK Cabernet Franc. This is a very heavy bodied dark red wine. Much to the concern of the inventors, in this case the wine bubble field 54' got stuck in the bottom of the retention chamber 12. The inventors even removed the aeration device including pulling out the stainless-steel aeration tube 30 out of the bottle and retention chamber. Yet, the wine bubble field remained stuck. The inventors then agitated the stuck bubble field to no effect. Then, the inventors were astounded to find that the bubble field 54' still did not dissipate after reinserting the stainless-steel tube 30 and using it to stir the bubble field. This was highly confusing and required additional testing.

Careful study of subsequent stuck bubble fields revealed that the wine bubbles were touching off at tangent points and forming a simply supported bridge which is supported at its two ends by the retention chamber's lower portion at the transition from its bottom of curvature to then the portion 44 that is inserted into the wine bottle. The inventors then re-purchased and re-tested many of the wines that had previously exhibited rapid and acceptable field 54' collapse with no sticking problem. However, all of these previously tested wines were relatively lighter bodied red and white wines (even Tequila) meaning that they were not as dark in color and as heavy bodied as the Tamarack from Washington. It's a feature of the wine industry that a high premium is placed on wines with a very heavy body which is also known as "an exceptional pour." Retesting confirmed that the shape of FIG. 4 worked very well and did not prevent bubble field collapse for all types of white wines, Zinfandel's, Pinots, Merlots, light bodied Cabernet's and the like. However, when tested with very heavy bodied wines and particularly the more expensive Cabernet red wines, the inventors found that the Insignia Napa Valley red wine, the Spotswood the Carnival Love Shiraz from Australia, the SORADA from Napa (Argentina), the Cameron Hughes 601 and 602, the Blue Boyed Boy Shiraz from Australia and the Josh Reserve Cabernet Sauvignon all got stuck and failed to collapse in the wine bottle. All these wines have a common feature in that they are all very heavy bodied. Unfortunately, a number of these heavy bodied wines got stuck for several minutes. This led the inventors to buy more heavy bodied red lines and deliberately search out the higher priced heavier body red wines for additional testing. Likewise, the real heavy bodied wines all resulted in stuck bubble fields 54'.

This sticking of the bubble field 54' in the highest end heavy bodied wines was very frustrating to the inventors after over seven years of testing without an issue. The inventors had to go back to the beginning and start again. The inventors then collaborated on ways to facilitate the collapse of the heavy bodied wines and directed their 3D modeling company to provide a number of new and novel shapes. The inventors ultimately found an ideal shape as illustrated in FIGS. 5 through 18.

FIGS. 5-14 show various views of the same structure being that of a novel expansion/retention chamber 12', such that one skilled in the art can appreciate the overall shape of the present invention.

Figure 11:
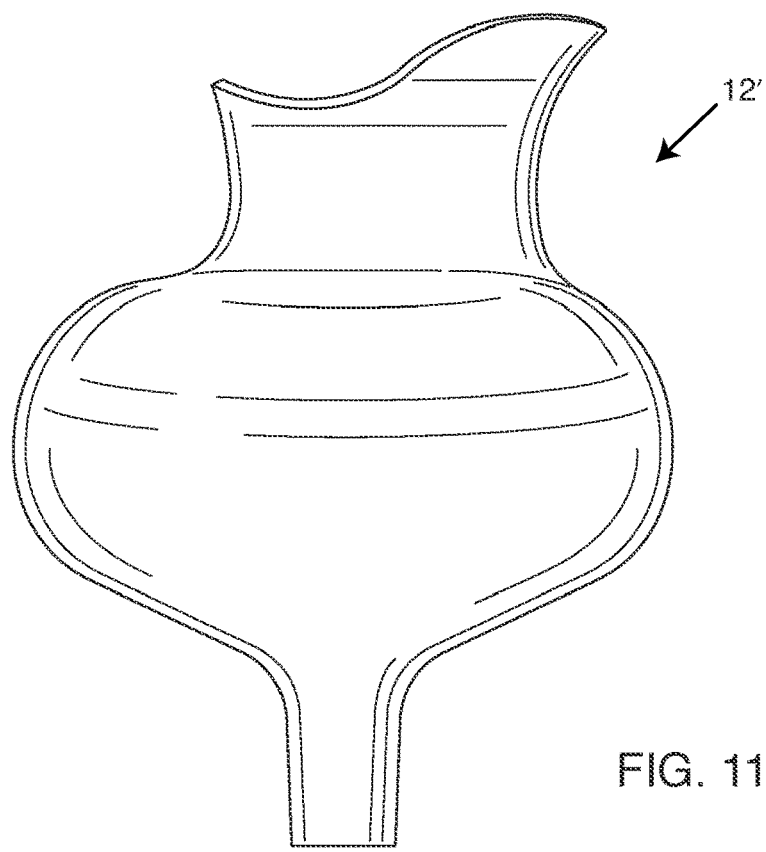
FIG. 11 is a left view of the structure of FIG. 5.
Figure 12:
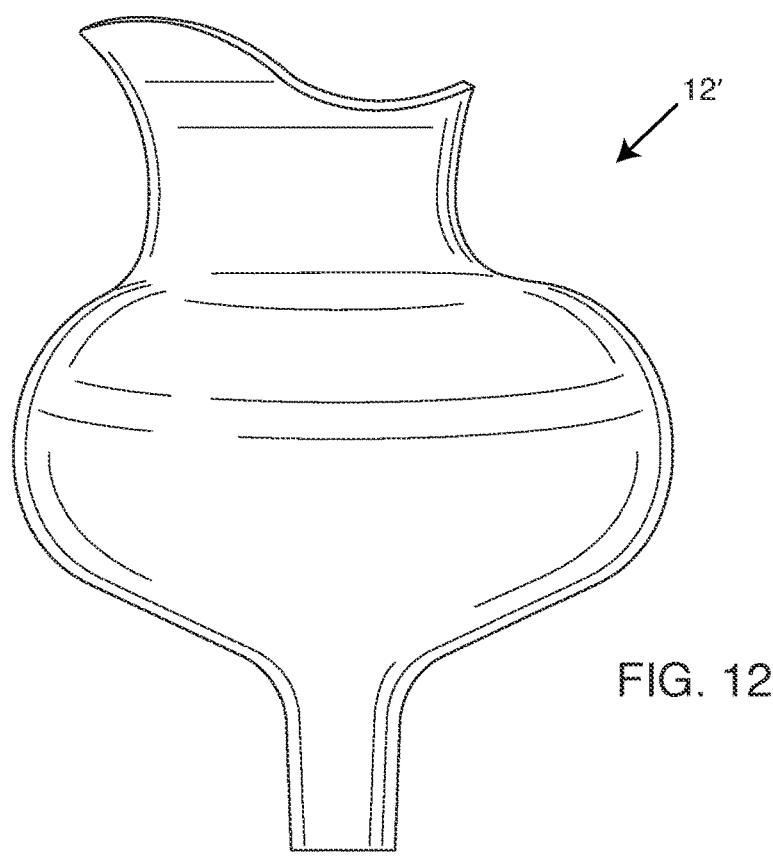
FIG. 12 is a right view of the structure of FIG. 5.
Figure 13:
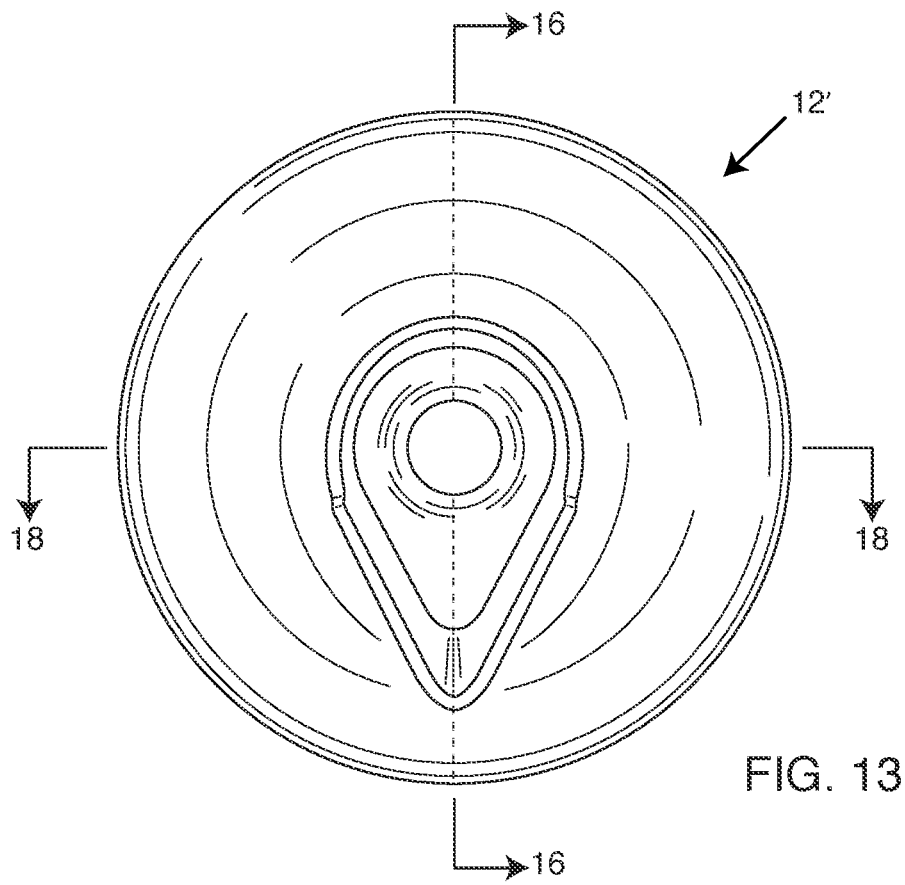
FIG. 13 is a top view of the structure of FIG. 5.
Figure 14:
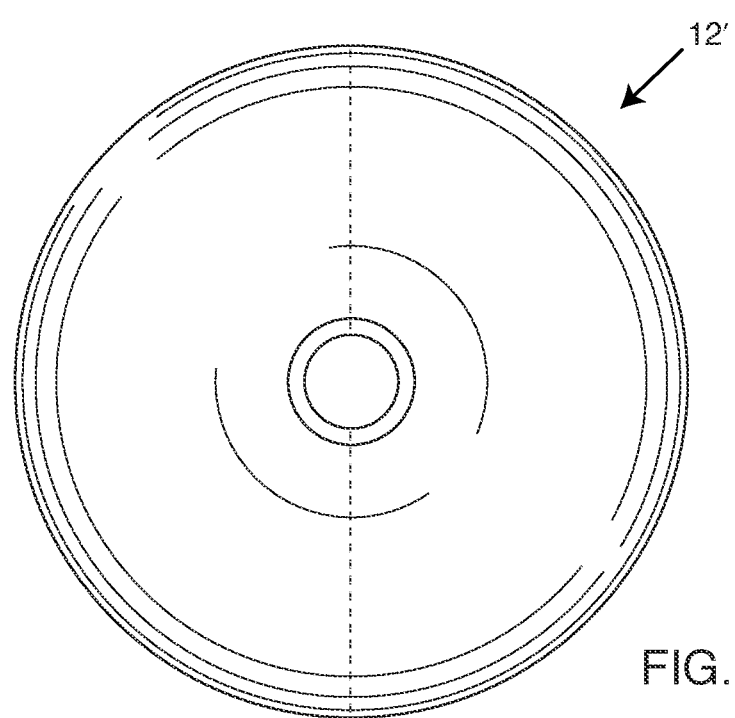
FIG. 14 is a bottom view of the structure of FIG. 5.
Figure 16:
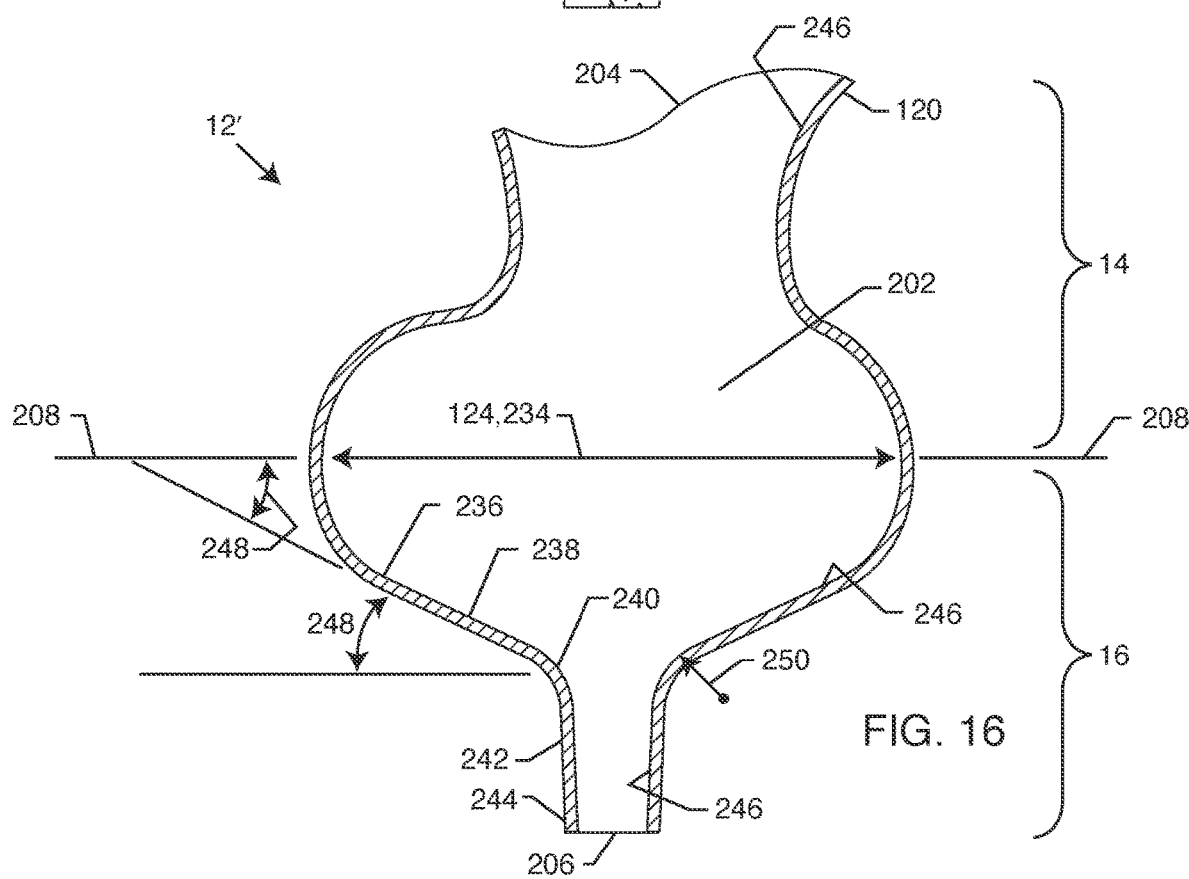
FIG. 16 is a side sectional view taken along lines 16-16 from FIG. 5, and which is similar to FIG. 15 for reference.

Referring now to FIGS. 11 and 12 in contrast to FIG. 4, one can see that the bottom portion of the wine retention chamber 12' (i.e. expansion chamber or spirit retention chamber) has been significantly altered. Again, 3D models using various radii and various angles were 3D printed and tested and the bubble field 54' collapse was timed. The shape as described in FIG. 12 and better identified in FIG. 16 provided a bubble field 54' that ideally collapsed within 20 to 30 seconds and perhaps as much as a minute in a worst-case scenario but never did get stuck. This is quite acceptable in the wine world. However, esthetically, the inventors are quite disappointed that after all these years, that the retention chamber 12 of FIG. 4 did not prove to be successful for the heaviest body red wines. The esthetic disappointment is that the retention chamber of FIG. 4 looks a lot like a restaurant decanting chamber that wines are poured into for aging (wine enthusiasts are used to the shape of FIG. 4) whereas the new design 12' does not retain as much of that decanting chamber look.

During the testing of the heaviest bodied red wines, the inventors also discovered an optional feature of the present invention. Referring back to FIG. 2 the pump structure 36 has an LED light 142. In the original prototypes in development the LED light stays on as long as aeration pump is running and the bubble field 54' is present. This makes for a very appealing look especially for red wines with a red LED. It's fascinating to watch the bubble field grow and dissipate. However, when the LED 142 turns off at the same time as the pump 36 turns off, it's hard to even appreciate bubble field 54' is stuck as sometimes in a dimly lit room it is hard to see inside the retention chamber 12'. In an alternative embodiment the present invention, the LED light 142 of FIG. 2 would not go off right after the pump 36 stops. Instead, the light, lamp or LED 142 would remain on for a period of time (e.g. seconds to as much as one minute) so that an observer can appreciate the beauty of the bubble field 54' collapse. Again, this is particularly important for heavy bodied red wines. Referring once again to FIGS. 12 and 16, even though the angle 248 and curve 250 has been optimized, it still takes the heaviest bodied red wines approximately 20 seconds or so to finally collapse. Again, having the LED light present during this collapse is a very interesting and entertaining thing to watch.

Figure 15:
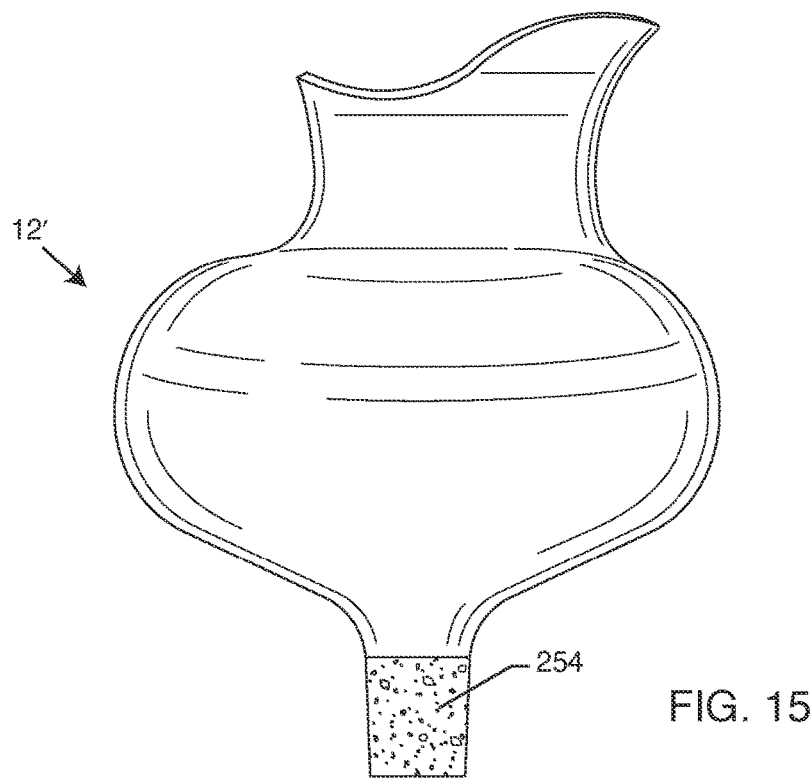
FIG. 15 is a view similar to that of FIG. 11 now showing a roughened bonding surface.
Figure 17:
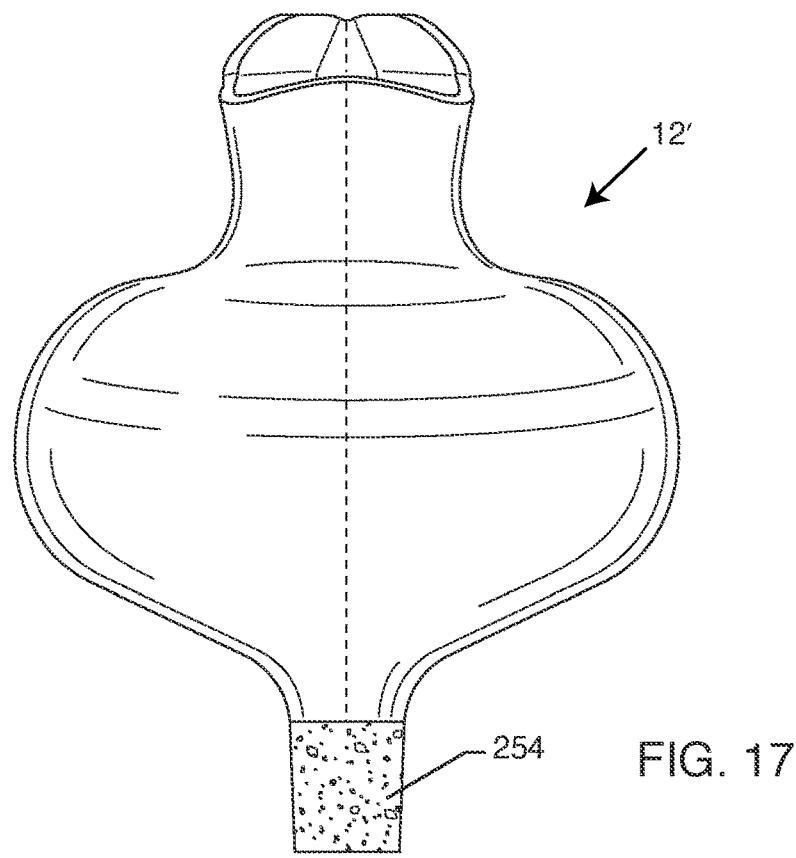
FIG. 17 is a view similar to that of FIG. 10 now showing the roughened bonding surface.
Figure 18:
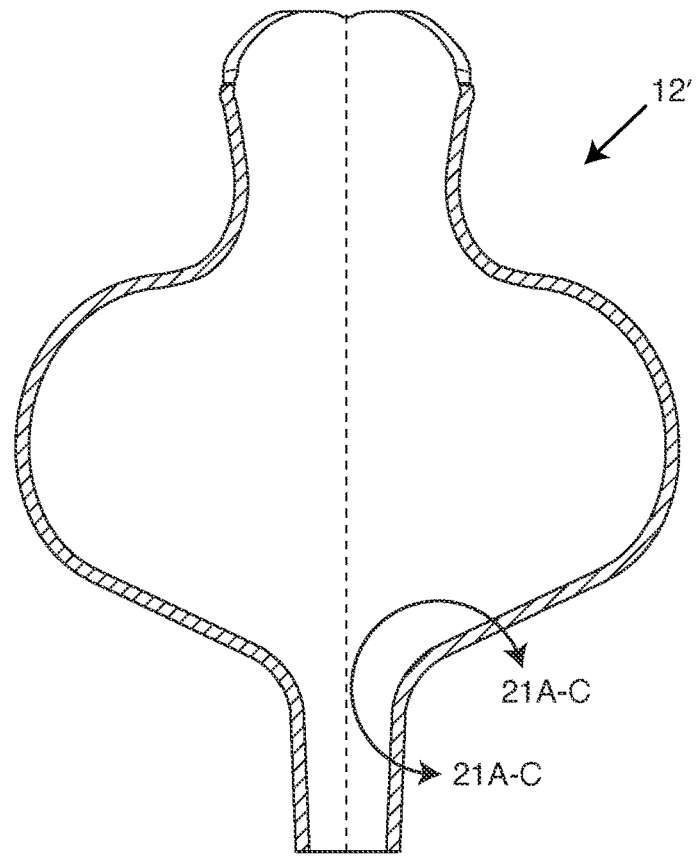
FIG. 18 is a rear sectional view taken along lines 18-18 from FIG. 5, and which is similar to FIG. 17 for reference.

During all the extensive redesign and extensive testing, the inventors also found that it was very difficult to permanently adhere the rubber seal 44 as shown in FIG. 3, whereas after multiple insertions in and out of the wine bottle the rubber seal would come off. The inventors did learn a way to build the retention chamber 12' out of very elegant spun and then hand formed glass. However, glass is a very smooth and slippery surface. This further led to the rubber cylindrical seal 44 popping off and disappearing into the wine bottle itself. The inventors had this bad experience a number of times and then tried various glues and adhesives none of which really worked. This led to the invention as shown in FIGS. 15 and 17 where there is a grit blasted or sandblasted or roughened surface 254 in the glass to create a rubber mating surface area. The inventors also found the roughened area worked better with plastic retention chambers. For the rubber or silicone seal 44, the roughened surface increases the surface area and helps bond a rubber glue to the glass or plastic. For an improved bond, in an embodiment the seal 44 would be made of a silicone base and the adhesive would likewise be made of a silicone, such that a strong silicone-to-silicone bond would be made between the glue and the seal.

These seal adhesion experiments were very lengthy and time consuming. Testing included multiple insertions in the wine bottle, deliberately getting wine (which is a solvent) into the adhesion area and multiple exposures to a dishwasher environment. In the present invention it is important that the seal's glue or adhesive be food grade (in the U.S. FDA and USDA approved). In a preferred embodiment, the glue would be a silicone-based food grade adhesive.

Referring now to FIG. 16, the hollow expansion chamber 12', comprises a chamber body 200 defined as having a top portion 14 above a bottom portion 16. In production, the top portion 14 and bottom portion 16 can be separately manufactured, such as with a plastic mold. Then, the two parts can be combined together with a bonding technique, a welding technique or the like. Alternatively, the expansion chamber 12' can be made in a left half and a right half. These halves can then likewise be combined together in a bonding or welding technique. Alternatively, the expansion chamber 12' can be made as one continuous part. For example, the expansion chamber 12' could be made of glass in a blow molding operation. In any of these embodiments, both the top portion and the bottom portion cooperatively form a hollow chamber volume 202 configured to temporarily contain an expansion of bubbles 54' during an aeration process for aerating a liquid, being wine and other alcoholic beverages.

As can be seen in FIG. 16, the chamber body has an oblate spheroidal shape 230. The oblate spheroidal shape can take on many forms, such as those shown in FIGS. 19 and 20. An oblate spheroidal shape can be visualized when taking a round ball and then smashing it to some degree. This is in contrast to a prolate spheroid that takes a round ball and stretches it at two opposite ends, such as in an American football or ruby football. Referring back to FIG. 19, it shows an ellipse for simplicity. The ellipse 230 can take on the form of the oblate spheroidal body when the shape is rotated about the minor axis 232. The major axis 234 is the longer axis and matches up to the inside diameter 124 of the expansion chamber.

Figure 19:
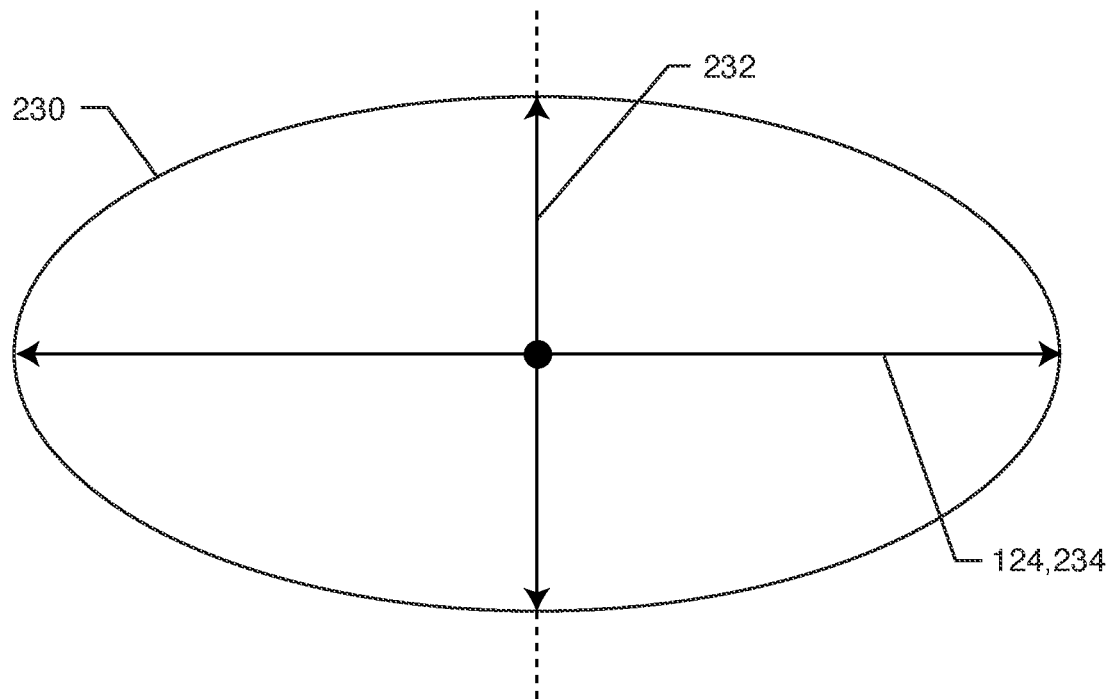
FIG. 19 is one embodiment of the underlying structure of an oblate spheroid.
Figure 20:
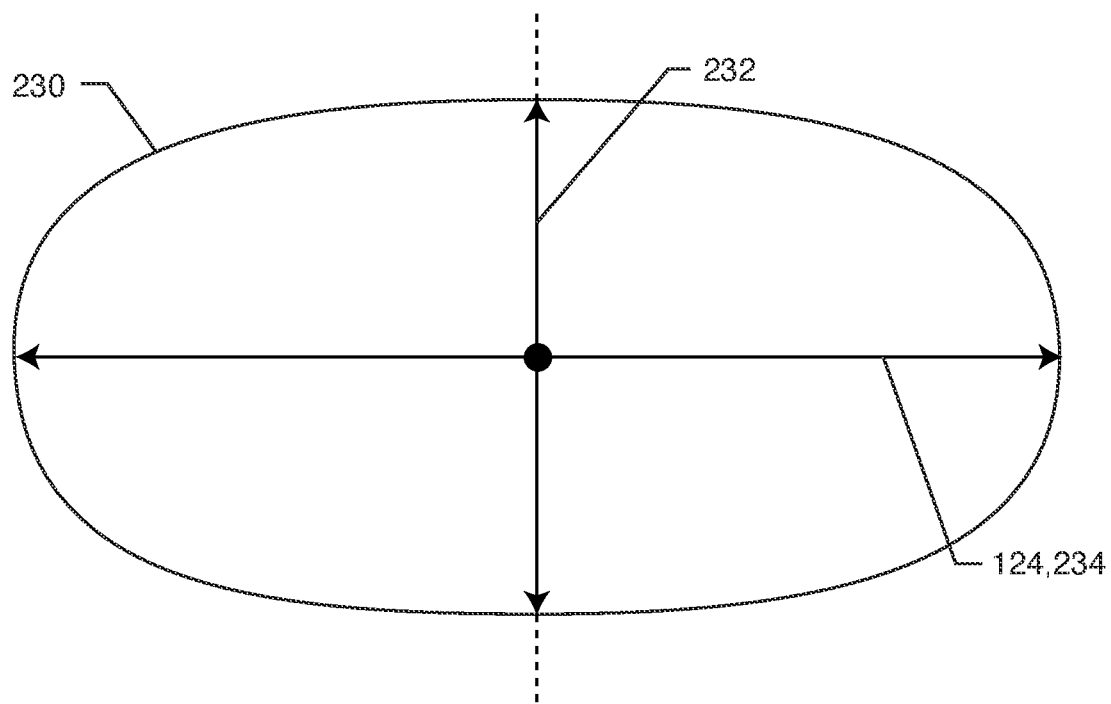
FIG. 20 is another embodiment of the underlying structure of an oblate spheroid.

FIG. 20 shows another example of an oblate spheroidal shape, where it is made from rotating the shape about the minor axis 232. As can be seen, FIG. 20 is a bit boxier in comparison to FIG. 10. Yet, FIGS. 19 and 20 are just two examples that show the oblate spheroidal shape can take on many forms, as this teaching is not limited to the exact embodiments shown and taught herein.

Referring back to FIG. 16, the top portion has a top opening 204. The top portion is disposed above the opening of the uncorked and/or opened bottle when the bottom opening is engaged with the opening of the uncorked and/or opened bottle. It is understood by those skilled in the art that the hollow chamber volume is in fluid communication with surrounding air through the top opening. It is also understood by those skilled in the art that the hollow chamber volume is configured to be in fluid communication with an inside of the uncorked and/or opened bottle when the bottom opening is engaged with the opening of the uncorked and/or opened bottle;

Referring again to FIG. 16, when moving circumferentially downward along the chamber body starting from the maximum inside diameter 124, the oblate spheroidal shape of the bottom portion has a first integral transition 236 to a first frustoconical shape 238. Then, continuing moving circumferentially downward the first frustoconical shape 238 has a second integral transition 240 to a cylindrical extension 242. The cylindrical extension at a distal end 244 has a bottom opening 206. The bottom opening is configured to engage inside an opening of an uncorked and/or opened wine bottle.

The maximum inside diameter 124 of the hollow chamber volume is in a horizontal plane 208 with respect to the uncorked and/or opened wine bottle when set upon a horizontal surface and is cooperatively formed between the top and bottom portions. This means that when the hollow expansion chamber is oriented with the top opening (directly) above the bottom opening, an entirety of an inside surface 246 of the hollow chamber volume of the chamber body is internally sloped to drain all the liquid out through the bottom opening.

The inventors have designed the retention chamber 12' to drain all the liquid and bubble field 54' out the opening 206 by changing the shape of the bottom portion 16. Namely, the first integral transition is a tangential first integral transition between the bottom portion of the chamber body to the first frustoconical shape. Importantly, the first frustoconical shape has a minimum angle 248 of 15 degrees relative to the horizontal plane 208. In other embodiments, the angle is higher and can be 20, 25 or 30 degrees. As illustrated in FIG. 16, the angle 248 is 25 degrees.

Furthermore, the second integral transition is a radial second integral transition having an inside surface radius 250 of at least 0.25 inches. In other embodiments, the radius 250 is at least 0.325, 0.50, 0.625, 0.75 or 1.00 inches. As shown in FIG. 16, the inside surface radius 250 is 0.5 inches.

The inventors have found that the frustoconical shape 238 and the radius 250 facilitate good bubble field dispersion (i.e. bubble field collapse and reduction) of even the heaviest bodied wines. However, it is understood by those skilled in the art that just one of these features could be utilized for an improvement over the previous designs, meaning that either of the frustoconical shape or the radius could be separately utilized. Yet, when both features are combined into one embodiment, it has yielded acceptable improvements over the previous designs.

Figure 21A:
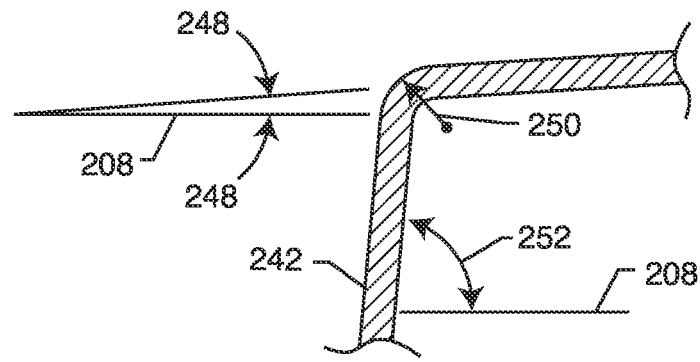
FIG. 21A is an enlarged sectional view of one embodiment taken along lines 21A-21A of FIG. 18.
Figure 21B:
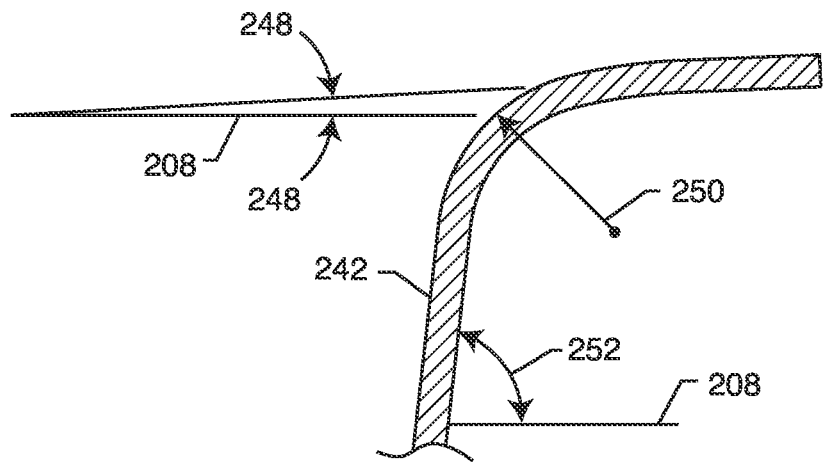
FIG. 21B is an enlarged sectional view of another embodiment taken along lines 21B-21B of FIG. 18.
Figure 21C:
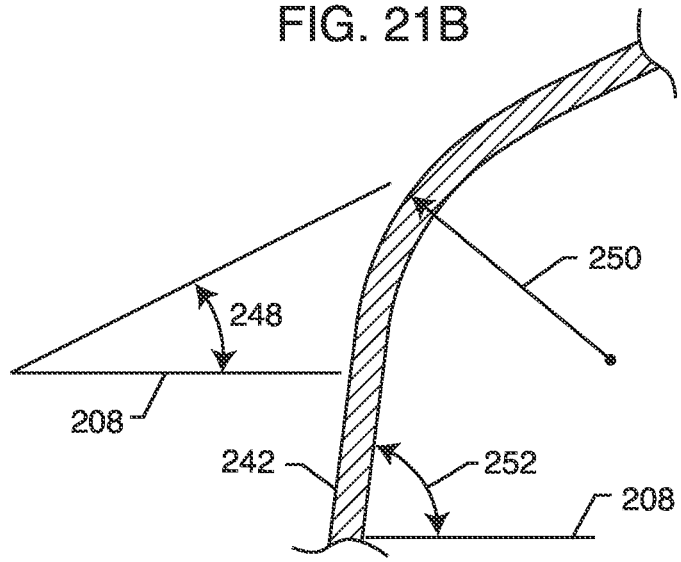
FIG. 21C is an enlarged sectional view of one embodiment taken along lines 21C-21C of FIG. 18.

FIGS. 21A-C are enlarged views that better help to show these novel features more clearly. FIG. 21A shows a design that is not optimized, such as those in FIGS. 3-4, as the radius 250 is too small and the angle 248 is not large enough. This design undesirably causes the bubble field to stick (i.e. not drain) particularly with the heaviest bodied red wines. Then, FIG. 21B is an improvement over FIG. 21A, where FIG. 21B now has a larger radius 250. Yet, FIG. 21C is the best design where now the radius 250 is larger and the angle 248 is larger in comparison to FIG. 21A.

In the prior designs such as that of FIG. 21A and as previously taught herein, careful study of subsequent stuck bubble fields revealed that the wine bubbles were touching off at tangent points and forming a simply supported bridge which is supported at its two ends by the retention chamber's lower portion at the transition from its bottom of curvature to then the portion 44 that is inserted into the wine bottle. Now, with the design as shown in FIG. 21B and best shown in FIG. 21C, the frustoconical shape and the larger radius of the second integral transition removes the end supports of the beam that forms when the tangent points of circular heavy bodied wine bubbles touch off on one another and touch the inside of the expansion chamber. Accordingly, the embodiments shown in FIG. 21B works better for bubble dispersion/collapse in comparison to FIG. 21A. Likewise, FIG. 21C works better for bubble dispersion/collapse in comparison to FIG. 21B. Therefore, FIG. 21C has shown great results for even the heaviest bodied red wines.

FIGS. 21A-C also show that there is an angle 252 between the cylindrical extension 242 and the horizontal plane 208. The angle 252 is close to 90 degrees but slightly less such that the cylindrical extension with the seal 44 secures snugly to the inside of the wine bottle. However, it is understood that angle 252 could indeed be at 90 degrees.

Although several embodiments have been described in detail for purposes of illustration, various modifications may be made to each without departing from the scope and spirit of the invention. Accordingly, the invention is not to be limited, except as by the appended claims.

REFERENCE NUMERALS

Hollow Expansion Chamber 12'
Top Portion 14
Bottom Portion 16
Maximum Inside Diameter 124
Chamber Body 200
Hollow Chamber Volume 202
Top Opening 204
Bottom Opening 206
Horizontal Plane 208
Oblate Spheroidal Shape 230
Minor Axis 232
Major Axis 234
First Integral Transition 236
First Frustoconical Shape 238
Second Integral Transition 240
Cylindrical Extension 242
Distal End 244
Inside Surface, Exp. Chamber 246
Angle 248
Radius 250
Angle 252
Roughened Surface 254

What is claimed is:

1. A hollow expansion chamber, comprising:
a chamber body defined as having a top portion above a bottom portion, wherein both the top portion and the bottom portion cooperatively form a hollow chamber volume configured to temporarily contain an expansion of bubbles during an aeration process for aerating a liquid, the liquid being wine or other alcoholic beverages;
wherein the chamber body has an oblate spheroidal shape, the top portion and bottom portion meeting to define a maximum inside diameter, the maximum inside diameter formed along a major axis when the oblate spheroidal shape is rotated about a minor axis;
wherein, when moving circumferentially downward along the chamber body starting from the maximum inside diameter, the oblate spheroidal shape of the bottom portion has a first integral transition to a first frustoconical shape, which continuing moving circumferentially downward the first frustoconical shape has a second integral transition to a cylindrical extension, the cylindrical extension at a distal end having a bottom opening, wherein the bottom opening is configured to engage inside an opening of an uncorked and/or opened alcoholic container or bottle;
wherein the top portion has a top opening, the top portion being disposed above the opening of the uncorked and/or opened alcoholic container or bottle when the bottom opening is engaged with the opening of the uncorked and/or opened alcoholic container or bottle, wherein the hollow chamber volume is in fluid communication with surrounding air through the top opening;

wherein the hollow chamber volume is configured to be in fluid communication with an inside of the uncorked and/or opened alcoholic container or bottle when the bottom opening is engaged with the opening of the uncorked and/or opened alcoholic container or bottle;

wherein the maximum inside diameter of the hollow chamber volume in a horizontal plane is cooperatively formed between the top and bottom portions;

wherein, when the hollow expansion chamber is oriented with the top opening above the bottom opening, an entirety of an inside surface of the hollow chamber volume of the chamber body is internally sloped to drain all the liquid out through the bottom opening;

wherein the first integral transition is a tangential first integral transition between the bottom portion of the chamber body to the first frustoconical shape;

wherein the first frustoconical shape has a minimum angle of 15 degrees relative to the horizontal plane; and wherein the second integral transition is a radial second integral transition having an inside surface radius of at least 0.25 inches.

2. The hollow expansion chamber of claim 1, wherein the first frustoconical shape has the minimum angle of 20 degrees relative to the horizontal plane.

3. The hollow expansion chamber of claim 1, wherein the first frustoconical shape has the minimum angle of 25 degrees relative to the horizontal plane.

4. The hollow expansion chamber of claim 1, wherein the radial second integral transition has the inside surface radius of at least 0.325 inches.

5. The hollow expansion chamber of claim 1, wherein the radial second integral transition has the inside surface radius of at least 0.50 inches.

6. The hollow expansion chamber of claim 1, wherein the expansion chamber is optically transparent or translucent, and wherein the chamber body consists of a polymer or of a glass.

7. The hollow expansion chamber of claim 1, including a sealing element attached to the bottom opening of the expansion chamber, wherein the sealing element is configured to seal against an inside surface of the opening of the uncorked and/or opened alcoholic container or bottle, wherein the sealing element comprises an elastic or rubber-like material.

8. The hollow expansion chamber of claim 1, wherein the maximum inside diameter is at least 2.50 inches.

9. The hollow expansion chamber of claim 1, wherein the maximum inside diameter is at least 2.75 inches and less than 4.5 inches.

10. The hollow expansion chamber of claim 1, wherein the maximum inside diameter is at least 3.0 inches and less than 4.25 inches.

11. The hollow expansion chamber of claim 1, wherein the maximum inside diameter is at least 3.25 inches and less than 4 inches.

12. The hollow expansion chamber of claim 1, wherein the maximum inside diameter is at least 3.50 inches and less than 3.75 inches.

13. The hollow expansion chamber of claim 1, wherein the maximum inside diameter is 3.625 inches plus or minus 10%.

14. The hollow expansion chamber of claim 1, wherein the top opening comprises a pour spout.

15. The hollow expansion chamber of claim 14, wherein the top opening of the expansion chamber is asymmetrically shaped about the minor axis shaped due to the pour spout, and wherein the bottom opening is symmetrically shaped about the minor axis.

16. The hollow expansion chamber of claim 15, wherein the bottom opening of the expansion chamber is configured to fit inside of the opening of the uncorked and/or opened alcoholic container or bottle.

17. The hollow expansion chamber of claim 1, wherein the uncorked and/or opened alcoholic container or bottle is a wine bottle.

18. A hollow expansion chamber, comprising:

a chamber body defined as having a top portion above a bottom portion, wherein both the top portion and the bottom portion cooperatively form a hollow chamber volume configured to temporarily contain an expansion of bubbles during an aeration process for aerating a liquid, the liquid being wine or other alcoholic beverages;

wherein the chamber body has an oblate spheroidal shape, the top portion and bottom portion meeting to define a maximum inside diameter, the maximum inside diameter formed along a major axis when the oblate spheroidal shape is rotated about a minor axis;

wherein, when moving circumferentially downward along the chamber body starting from the maximum inside diameter, the oblate spheroidal shape of the bottom portion has a first integral transition to a first frustoconical shape, which continuing moving circumferentially downward the first frustoconical shape has a second integral transition to a cylindrical extension, the cylindrical extension at a distal end having a bottom opening, wherein the bottom opening is configured to engage inside an opening of an uncorked and/or opened alcoholic container or bottle;

wherein the top portion has a top opening, the top portion being disposed above the opening of the uncorked and/or opened alcoholic container or bottle when the bottom opening is engaged with the opening of the uncorked and/or opened alcoholic container or bottle, wherein the hollow chamber volume is in fluid communication with surrounding air through the top opening;

wherein the hollow chamber volume is configured to be in fluid communication with an inside of the uncorked and/or opened alcoholic container or bottle when the bottom opening is engaged with the opening of the uncorked and/or opened alcoholic container or bottle;

wherein the maximum inside diameter of the hollow chamber volume in a horizontal plane is cooperatively formed between the top and bottom portions;

wherein, when the hollow expansion chamber is oriented with the top opening above the bottom opening, an entirety of an inside surface of the hollow chamber volume of the chamber body is internally sloped to drain all the liquid out through the bottom opening;

wherein the first integral transition is a tangential first integral transition between the bottom portion of the chamber body to the first frustoconical shape; and wherein the first frustoconical shape has a minimum angle of 20 degrees relative to the horizontal plane.

19. The hollow expansion chamber of claim 18, wherein the second integral transition is a radial second integral transition having an inside surface radius of at least 0.325 inches.

20. A hollow expansion chamber, comprising:

a chamber body defined as having a top portion above a bottom portion, wherein both the top portion and the bottom portion cooperatively form a hollow chamber volume configured to temporarily contain an expansion of bubbles during an aeration process for aerating a liquid, the liquid being wine or other alcoholic beverages;

wherein the chamber body has an oblate spheroidal shape, the top portion and bottom portion meeting to define a maximum inside diameter, the maximum inside diameter formed along a major axis when the oblate spheroidal shape is rotated about a minor axis;

wherein, when moving circumferentially downward along the chamber body starting from the maximum inside diameter the oblate spheroidal shape of the bottom portion has a first integral transition to a first frustoconical shape, which continuing moving circumferentially downward the first frustoconical shape has a second integral transition to a cylindrical extension, the cylindrical extension at a distal end having a bottom opening, wherein the bottom opening is configured to engage inside an opening of an uncorked and/or opened alcoholic container or bottle;

wherein the top portion has a top opening, the top portion being disposed above the opening of the uncorked and/or opened alcoholic container or bottle when the bottom opening is engaged with the opening of the uncorked and/or opened alcoholic container or bottle, wherein the hollow chamber volume is in fluid communication with surrounding air through the top opening;

wherein the hollow chamber volume is configured to be in fluid communication with an inside of the uncorked and/or opened alcoholic container or bottle when the bottom opening is engaged with the opening of the uncorked and/or opened alcoholic container or bottle;

wherein the maximum inside diameter of the hollow chamber volume in a horizontal plane is cooperatively formed between the top and bottom portions;

wherein, when the hollow expansion chamber is oriented with the top opening above the bottom opening, an entirety of an inside surface of the hollow chamber volume of the chamber body is internally sloped to drain all the liquid out through the bottom opening;

wherein the first integral transition is a tangential first integral transition between the bottom portion of the chamber body to the first frustoconical shape; and wherein the second integral transition is a radial second integral transition having an inside surface radius of at least 0.325 inches.

* * * * *

UNITED STATES PATENT AND TRADEMARK OFFICE
CERTIFICATE OF CORRECTION

| | |
|---|---|
| PATENT NO. | : 11,465,106 B2 |
| APPLICATION NO. | : 17/445942 |
| DATED | : October 11, 2022 |
| INVENTOR(S) | : Robert Stevenson et al. |

It is certified that error appears in the above-identified patent and that said Letters Patent is hereby corrected as shown below:

On the Title Page

On Page 2
Column 2, References Cited, Other Publications:
Line 2, "index php" should read --index.php--.
Line 11, "re views" should read --reviews--.

Signed and Sealed this
Twenty-fifth Day of April, 2023

Katherine Kelly Vidal
*Director of the United States Patent and Trademark Office*